United States Patent
Smaagard et al.

(10) Patent No.: US 11,924,379 B1
(45) Date of Patent: Mar. 5, 2024

(54) SYSTEM AND METHOD FOR IDENTIFYING COMPLIANCE STATEMENTS FROM CONTEXTUAL INDICATORS IN CONTENT

(71) Applicant: Calabrio, Inc., Minneapolis, MN (US)

(72) Inventors: Kyle Smaagard, Forest Lake, MN (US); Dylan Morgan, Minneapolis, MN (US); Laura Cattaneo, Rochester, MN (US); Catherine Bullock, Minneapolis, MN (US); Chris Vanciu, Sie, MN (US); Boris Chaplin, Medina, MN (US)

(73) Assignee: Calabrio, Inc., Minneapolis, MN (US)

( * ) Notice: Subject to any disclaimer, the term of this patent is extended or adjusted under 35 U.S.C. 154(b) by 0 days.

(21) Appl. No.: 18/088,484

(22) Filed: Dec. 23, 2022

(51) Int. Cl.
*H04M 3/00* (2006.01)
*G10L 15/08* (2006.01)
*H04M 3/51* (2006.01)

(52) U.S. Cl.
CPC .......... *H04M 3/5175* (2013.01); *G10L 15/08* (2013.01); *G10L 2015/088* (2013.01); *H04M 2201/40* (2013.01)

(58) Field of Classification Search
CPC . H04M 3/5175; G10L 15/08; G10L 2015/088
USPC ....... 379/265.01–265.14, 266.01–266.1, 309
See application file for complete search history.

(56) References Cited

U.S. PATENT DOCUMENTS

| | | | |
|---|---|---|---|
| 9,779,760 B1* | 10/2017 | Ouimette | H04M 3/5166 |
| 9,785,638 B1* | 10/2017 | Eveland | G06F 16/242 |
| 10,237,405 B1* | 3/2019 | Neuer, III | H04M 3/5175 |
| 2008/0027783 A1 | 1/2008 | Hughes | |
| 2015/0195406 A1* | 7/2015 | Dwyer | H04M 3/5191 379/265.07 |
| 2020/0279180 A1 | 9/2020 | Yu | |
| 2021/0157834 A1* | 5/2021 | Sivasubramanian | G06F 16/686 |
| 2022/0075961 A1* | 3/2022 | Cavallari | G06F 40/20 |
| 2022/0360669 A1 | 11/2022 | Munoz | |
| 2022/0374814 A1* | 11/2022 | Buchbinder | G06Q 10/063112 |
| 2023/0064482 A1* | 3/2023 | Vikramaratne | G06F 21/6245 |

* cited by examiner

*Primary Examiner* — William J Deane, Jr.

(57) ABSTRACT

Aspects of the present disclosure relate to evaluating a contact center agent using an automated evaluation process that employs aspects of machine learning to review pieces of content, identify context within a piece of content where a compliance statement is required, and determine if a compliance statement was given by the agent. In some embodiments, a compliance model is trained and utilized to recognize context within the customer-agent interaction indicating that a compliance statement should be given by the agent. The presence or absence of a compliance statement in the piece of content may then be evaluated by the model and reported to the contact center supervisor. The automated nature of the invention efficiently and effectively reduces the unnecessary randomness introduced by a manual review process while providing improved assurance that compliance requirements are consistently provided during customer interactions.

16 Claims, 5 Drawing Sheets

SYSTEM AND METHOD FOR IDENTIFYING COMPLIANCE STATEMENTS FROM CONTEXTUAL INDICATORS IN CONTENT

BACKGROUND

Evaluating contact center agents can be a challenging task for a supervisor to accomplish because the repetitive nature of the work may make it difficult to recognize training issues as they arise. In instances where the evaluation process is performed manually by the supervisor it can be difficult for the supervisor to process the high volume of calls a single agent may be involved with, let alone recognize discrepancies that exist in a small subset of the total call volume across all agents. The primary concern is that an agent can have multiple high-performing interactions with customers that obscure inconsistent errors on high priority items which must be included during the interaction, such as an agent meeting compliance requirements. During the manual review process, it is very difficult for the supervisor to review and identify within each piece of content instances where a compliance statement should have been included by the agent. If left uncorrected, the absence of a compliance statement could have lasting ramifications for the customer as well as the enterprise employing the contact center and the agent.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to evaluating a contact center agent using an automated evaluation process that employs aspects of machine learning to review pieces of content, identify context within a piece of content where a compliance statement is required, and determine if a compliance statement was given by the agent. In some aspects, a compliance model is trained and utilized to recognize context within the customer-agent interaction indicating that a compliance statement should be given by the agent. The presence or absence of a compliance statement in the piece of content may then be evaluated by the model and reported to the contact center supervisor. The automated nature of the invention efficiently and effectively reduces the unnecessary randomness introduced by a manual review process while providing improved assurance that compliance requirements are consistently provided during customer interactions.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exclusive examples are described with reference to the following figures.

DETAILED DESCRIPTION

Figure 1:
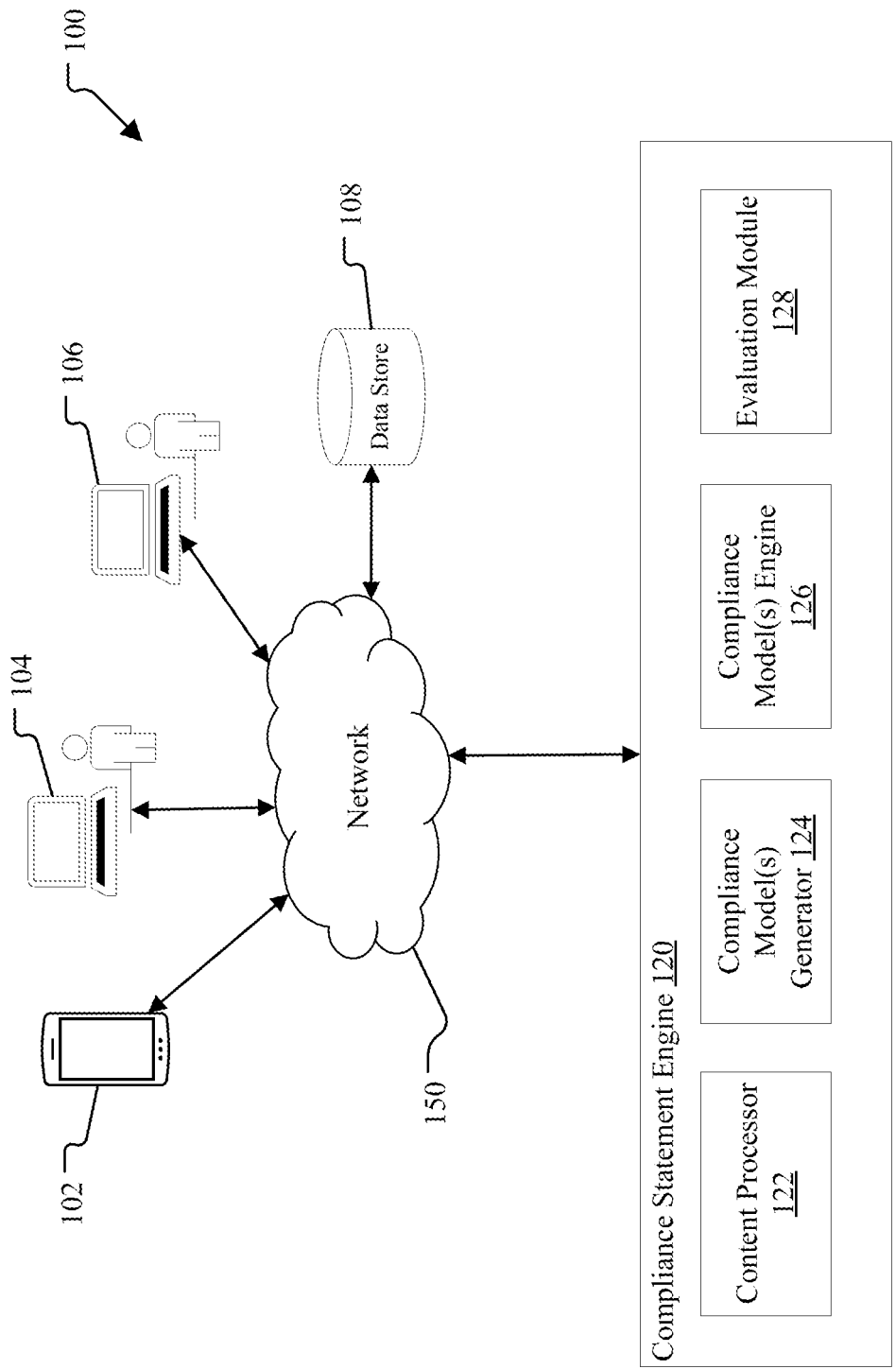
FIG. 1 is a diagram illustrating a system for identifying a compliance statement, according to aspects described herein.

In the following detailed description, references are made to the accompanying drawings that form a part hereof, and in which are shown by way of illustrations specific embodiments, aspects, or examples. These aspects may be combined, other aspects may be utilized, and structural changes may be made without departing from the present disclosure. Aspects disclosed herein may be practiced as methods, systems or devices. Accordingly, disclosed aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In aspects, a customer may interact with an agent at a contact center about some matter. The interaction may be initiated by either the customer or the agent based on the topic to be discussed. During the course of the interaction between the agent and the customer the topics discussed may require the agent to deliver one or more compliance statements to the customer. The compliance statements could be provided for a variety of reasons such as to meet regulatory requirements, to inform the customer about certain aspects of a product or topic, and/or to address certain business policies (e.g., return policy). Broadly, a compliance statement is a disclosure which must be given by the agent in order to ensure that the agent, contact center, the relevant enterprise employing the contact center, and potentially other third parties are abiding by the laws and regulations set forth by various regulatory authorities. For example, the agent and customer may be discussing personal banking matters in relation to a new home loan that require one or more disclosure statements to be given by the agent to the customer. In another example, if the agent is contacting the customer to collect a debt certain required disclosures may need to be given to the customer before proceeding with the interaction.

In some instances, the agent will recognize the context of the interaction and provide the required compliance statement, thereby satisfying the compliance requirements for the interaction. However, in other instances, an agent may not provide the required compliance statement and/or the agent may not provide a complete compliance statement. In instances where a mandatory compliance statement is not given by the agent, there is a risk of reputational, legal, and monetary risks for the enterprise employing the contact center. Supervisors at contact centers are often tasked with performing agent evaluations to ensure that compliance statements are provided as required.

In examples, the agent evaluation process is performed by the supervisor manually reviewing one or more pieces of content for each agent to determine if a compliance statement should have been provided, and then verifying that it was provided. The manual review process for evaluating contact center agents is a challenging proposition for the supervisor for two reasons. First, because it relies on the supervisor to correctly recognize and categorize each instance of agent performance relative to standards by manually reading and/or listening to each piece of content. Too often, the supervisor may miss an instance where a compliance statement is required because the context of the interaction does not obviously indicate a statement is required. This may be true, even if the supervisor uses review aids such as a compliance related relevant phrase list during their manual review of the piece of content.

Second, and perhaps most importantly, the manual review process can be overwhelming due to the high volume of content the supervisor needs to review for each agent at the contact center. In some instances, an agent may participate in dozens or more calls per shift that could require a compliance statement. As such, it is often not possible for the supervisor to review each piece of content for each agent, meaning instances of sub-standard performance may not be identified during the manual review process. This scenario results in an incomplete representation of an agent's actual performance across all interactions with the customers. In the case of mandatory compliance statement reporting, an agent failing to make the required disclosure to a customer is an unacceptable outcome. If the issue is not recognized due to the challenges associated with a manual review process, what may be an isolated incident could expand into a serious issue that could be difficult and costly to correct.

To address this issue, aspects of the present disclosure relate to automated compliance statement identification to help contact centers automatically identify when an agent successfully and unsuccessfully meets mandatory compliance statement requirements. In some aspects, an existing large language model may be fine-tuned in training to generate a compliance model trained to recognize context around triggering phrases indicating that a compliance statement should be provided by an agent. The compliance model may be trained on training data generated from multiple pieces of content related to agent-customer interactions. In some examples, the compliance model may be trained to recognize exact relevant phrases which require a compliance statement be given from a relevant phrase list. In other aspects, the compliance model may be trained to recognize context in a piece of content that commonly exists when a compliance statement is required to be given. To generate a prediction in either aspect, the compliance model may be utilized to analyze a piece of content and predict, that either a relevant triggering phrase and/or sufficient context was present to require a compliance statement be provided by the agent. Based on the prediction, the piece of content can be analyzed to determine if the required compliance statement is present or absent and notify the supervisor about the analysis. Agent performance in providing the required compliance statements can be evaluated based on the analysis.

Use of the compliance model to identify compliance statements and evaluate agent performance provides substantial improvements over the currently utilized manual review process. Primarily, the compliance model is a more efficient and complete means for a supervisor to evaluate agent performance. The system replaces the cumbersome manual review of only a few pieces of content for an agent, with the ability to review many, if not all pieces of content related to an agent. Further, the compliance model limits the potential for any bias which could be introduced by the supervisor when performing a manual review. Additionally, the compliance model may recognize instances where a compliance statement was required, based on context or a relevant phrase, and omitted which the agent and supervisor could both miss. Ultimately, the compliance model provides assurances to the enterprise that the required compliance statements are being provided by the agent, and if not provided effectively highlights areas where additional training is necessary to ensure compliance statements are given.

FIG. 1 is a diagram illustrating a system for identifying a compliance statement, according to aspects described herein. A system 100 may include a customer device 102, an agent device 104, a supervisor device 106, a data store 108, and a compliance statement engine 120 which communicate over a network 150. The compliance statement engine 120 may include a content processor 122, a compliance model(s) generator 124, a compliance model(s) engine 126, and an evaluation module 128. The compliance model(s) generator 124 and compliance model(s) engine 126 are referenced as pluralities to account for the compliance statement engine 120 including one or more compliance models based on enterprise or industry requirements (e.g., banking, medical, debt collection, etc.). In some instances, it may be preferable to include different kinds and quantities of compliance models that are fine-tuned to identify certain compliance related contexts within the compliance statement engine 120. In such an example, multiple instances of a compliance model generator 124 and compliance model engine 126 may be included in the compliance statement engine 120 for each fine-tuned compliance model. For ease of discussion, the description herein refers to a single compliance model generator 124 and compliance model engine 126 included in the compliance statement engine 120. But features and examples of the compliance model generator 124 and compliance model engine 126 are applicable to each compliance model included in the compliance statement engine 120.

Compliance statement engine 120 may include one or more server devices, distributed computing platforms, cloud platform devices, processors, and/or other computing devices such as the content processor 122. Compliance statement engine 120, content processor 122, compliance model generator 124, compliance model engine 126, and evaluation module 128 communicate with data store 108, customer device 102, agent device 104, and supervisor device 106 via network 150.

In a typical use scenario, a customer may contact the contact center on customer device 102 and may be assisted by an agent on the agent device 104. In some instances, the agent's supervisor may be involved in the customer agent interaction either directly (e.g., speaking directly to the customer based on their request or for training purposes) or indirectly (e.g., to monitoring the interaction) via supervisor device 106. During the agent-customer interaction one or more topics may be discussed which require the agent to provide a compliance statement to the customer. In such instances, it is incumbent upon the agent to recognize the need to provide a compliance statement based on the topic of conversation. In many instances, the agent will provide the required compliance statement, in other instances the agent may not provide the required compliance statement.

The interaction between the customer and agent is content which can be utilized by the compliance statement engine 120 following the interaction to determine if the required compliance statement was provided. All methods of agent-customer interaction may be recorded and utilized as content by the compliance statement engine 120. For example, the agent-customer interaction may occur as a voice call where the customer and agent are talking to each other, as a text chat in a chat window with an instant messaging function, as a combination of both voice and text, as a series of emails between the agent and customer, as a video teleconference where the agent and customer may see and speak to each other, and/or by some other means where the agent and customer may interact with each other over the network 150. The interaction between the agent and customer may be recorded as a piece of content and stored in data store 108. The metadata for each piece of content may also be stored on the data store 108.

Content processor 122 may access the pieces of content stored on data store 108 and prepare them for use by the compliance model generator 124 and/or compliance model engine 126. The content processor 122 will determine for each piece of content if there is a corresponding transcript for the piece of content. A transcript is a text-based record based on an agent-customer interaction which includes the spoken and/or written phrases of both the customer and agent labeled for who made the phrase, including a time stamp for when the phrase occurred. A phrase is an expression of something in speech or text from an individual in the transcript which may occur as a statement, utterance, sentence, or any other segment of speech or text of varying length. The phrase does not need to be a complete sentence or thought. Abrupt verbal expressions, one person interrupting the other, slang and other colloquialisms may be considered phrases. As such, the content processor 122 may be designed to identify phrases of varying dimensions such as length of the phrase and connectivity between phrases within the transcript. In some aspects, the content processor 122 may utilize natural language processing or other machine learning methods to identify phrases from a piece of content. The transcript remains connected to the piece of content where the content is the source document for the transcript. Once generated by the content processor 122, the transcript may be stored on data store 108.

Compliance model generator 124 may be utilized to create a relevant phrase list, generate training data, train a compliance model, and generate the trained compliance model. Compliance statements vary by industry and enterprise, so a relevant phrase list must be created for each industry and enterprise. The compliance model generator 124 may be utilized to create a relevant phrase list that includes enterprise specific compliance statements along with one or more triggering phrases which could occur in a piece of content. The presence of a triggering phrase should trigger the agent to provide the corresponding compliance statement. One or more natural language processing algorithms may be utilized to assist with creating the relevant phrase list.

The relevant phrase list may include one or more phrases, words, topics, and/or actions as triggering phrases which could occur in a piece of content coupled to a corresponding compliance statement. In the case of phrases, for example, a relevant phrase list for the banking industry may include "confirm your last four, name and date of birth," "what is the expiration date and security code on the back of the card," and/or "please give me your social security number" among other examples. In some aspects, certain words and/or topics related to the industry and/or enterprise may also be included in the relevant phrase list. In the banking industry this may mean words and/or topics such as "loan," "interest rate," "credit card," and/or "401k" may be directly included in the relevant phrase list with a corresponding compliance statement. In addition to the topic itself one or more common phrases related to the topic may also be included in the relevant phrase list and tied to the corresponding compliance statement. For example, in the banking industry the topic "401k" may also include related topic phrases such as "I want to plan for my retirement," simply "retirement," "do I have any options to defer taxes" among others.

In further examples, certain actions which occur in a piece of content may trigger a compliance statement. A triggering action may be a verbal or non-verbal indication that at least one of the customer and/or agent made an explicit act which relates to a topic requiring a compliance statement. The explicit act could be a variety of actions by either the agent or customer often based on the media type associated with the piece of content. The explicit act could include, a physical movement of the body, a confirming selection of an on-screen indicator, typing out a question in a chat box with a related topic, among many others. For example, if the agent-customer interaction occurred in a chat window, the selection of an on-screen indicator for a certain interest rate by either the agent and/or customer would be the explicit action indicating that the required compliance statement should have been provided.

In some aspects, the relevant phrase list may consist of exact matching for included phrases, words, topics, and/or actions. However, the relevant phrase list can be expanded to include contextual matching for synonym phrases related to one or more of the included phrases, words, topics, and/or actions. In this case the synonym phrase is one or more common variations of the relevant phrase. For example, the phrase "what is the expiration date and security code on the back of the card," could include synonym phrases such as "do you have your security code," "my security code is," "my expiration date is," "the date on the card is," etc. One or more natural language processing tools could be utilized to expand the relevant phrase list to include synonym phrases such as fuzzy matching, phonetic matching, phrase embeddings, and/or gestalt pattern matching.

In certain examples, it may be beneficial to mask, meaning remove certain words, phrases, topics, actions, and/or phrases to improve the training data and ultimately the compliance model's ability to recognize triggering phrases. For example, the relevant phrase list may include the triggering phrase "Before I can confirm your account transfer, I will need to verify a few details. What is your social security number and your mother's maiden name?" If masking is applied certain words within the triggering phrase may be removed, such as "your social security number." Then, the triggering phrase may be included in the relevant phrase list as "Before I can confirm your account transfer, I will need to verify a few details. What is and your mother's maiden name?" Thus, masking certain aspects of the triggering phrase increases the probability that the trained compliance model will recognize the compliance related context around similar phrases in a piece of content. If masking is utilized, in some aspects, the general large language compliance model may initially be trained using an unmasked relevant phrase list followed by a masked relevant phrase list. Alternatively, the large language model may be trained on the masked relevant phrase list directly without applying the unmasked phrase list.

To generate training data, the compliance model generator 124 may access one or more pieces of content stored in the data store 108. Once accessed the content may be analyzed utilizing the relevant phrase list to identify triggering phrases. Once a triggering phrase is identified, the compliance model generator 124 may search in the content to determine the presence or absence of a compliance statement corresponding to the triggering phrase. For example, in the banking context if the compliance model generator 124 identifies the phrase "what is the security code on the back of the card" it may search the entire piece of content to see if the compliance statement was provided by the agent. In instances it may be necessary to search the entire piece of content because the presently identified triggering phrase may not be the first or only triggering phrase for the same compliance statement. In the previous example, the phrase "what is the security code on the back of the card" may be a second triggering phrase for the same compliance statement. By searching the entire piece of content from beginning to end for the presence of the corresponding compliance statement it may be determined that the required compliance statement was provided earlier in the piece of content in response to a separate triggering phrase.

In some aspects, an optional content search parameter may be applied by the compliance model generator 124, based on industry or enterprise requirements. For some industries, enterprises, and/or compliance instances a required compliance statement must be provided within a certain limit from the triggering phrase or the compliance requirement is not met. In other instances, the compliance statement may be provided at any point during the content and the compliance requirement is satisfied. The content search parameter provides functionality to address this issue. The content search parameter is a search limit that can be optionally applied to limit how much of the content and/or what portions of the content are searched to identify the compliance statement associated with the triggering phrase. The content search parameter could be set to limit the amount of time and/or words can be searched in the content before or after the occurrence of the triggering phrase. For example, a limit of one minute after a triggering phrase or one thousand words after a triggering phrase could be set. Additionally, the content search parameter could be set to specify which participant in a piece of content should be searched. This parameter would be applicable in a situation where multiple agents and/or supervisors participated in an interaction, but the evaluation was related to a particular agent. In this case, by setting the content search parameter only to identify compliance statements provided by agent 1 the compliance model generator 124 can filter out compliance statements provided by agent 2 and/or supervisor 3 etc. A person having ordinary skill in the art will understand how a content search parameter can be included to set parameters on how much of a piece of content and what in a piece of content is identified.

After searching the piece of content, the compliance model generator 124 will label the piece of content as either containing the corresponding compliance statement or not. The labeling is based on a compliance statement that has been associated with the triggering phrase. The labeling may be a binary classification where the triggering phrase that does have a corresponding compliance statement has a label of "1" while the piece of content without the compliance statement has a label of "0." Alternatively, the labeling may be a multi-label classification where N is the total number of classifications possible in training. Multi-label classification could be utilized based on industry and/or enterprise requirements to provide increased granularity and greater understanding of the presence and/or absence of different types of required compliance statements. For example, a three variable label could be utilized in the banking industry for a general compliance model trained on a phrase list to recognize multiple and/or different compliance related triggering phrases. In this case the three variable label may recognize triggering phrases for loans, interest rates, and credit cards which each require different compliance statements.

Once a plurality of pieces of content and triggering phrases have been analyzed and labeled a corpus of training data may be generated that can be used by the compliance model generator 124 to train and fine-tune a large language model such as BERT, distilBERT, or others. In training, the one or more compliance models learn the context surrounding language requiring a compliance statement. The training can be focused to fine-tune a compliance model to recognize specific context related to a specific industry or enterprise. To fine-tune a compliance model the general large language model may receive training data derived from one or more relevant phrase lists specifically generated for the industry and/or enterprise. For example, one compliance model could be generated for the banking industry to recognize common compliance related contextual triggers for multiple topics like loans, interest rates, credit cards, etc. Another compliance model could be developed for a hospital to recognize multiple common compliance related contextual triggers for topics like privacy related personal information, hospital bills, diagnosis and test result notifications, etc. Once trained, the compliance model may be able to recognize not only triggering phrases included in the relevant phrase list but also phrases not included in the relevant phrase list but with a context similar to those in the relevant phrase list. This improves the compliance model predictions because they can be based on triggering phrases included in the relevant phrase list and those contextually similar to phrases in the relevant phrase list.

In additional examples, one or more compliance models could be generated for a single industry or enterprise to specifically recognize contextual triggers related to a certain topic. In this example, the same enterprise, such as a bank, may have four or more compliance related models specifically fine-tuned on a relevant phrase list for a specific topic. For example, a bank may have a loan specific compliance model, an interest rate specific compliance model, a credit card specific compliance model, a foreclosure specific compliance model, etc. One having skill in the art will recognize that the granularity applied in training based on the relevant phrase list utilized by the compliance model generator 124 to fine tune a compliance model may vary such that a very specific compliance model and/or a general compliance model can be generated.

Once trained by the compliance model generator 124, the compliance model can output a prediction of when a compliance statement should be provided by the agent. The output of the compliance model can be a binary classification and/or multi-label vector. In binary instances, the output is a classification of either 1 or 0 (e.g., yes or no) that a compliance statement should have been provided. For example, if the model predicts that a compliance statement should have been provided the output would be 1 with the 1 indicating that the compliance statement should have been provided. Conversely, if the model predicts the agent should not have been provided the output would be 0 where the 0 indicates the compliance statement should not have been provided.

Additional granularity may be provided to the compliance model output in multi-label output instances. In this case, the output of the compliance model may be a vector of length N, where N is the number of compliance statement triggers that a model is tuned to search for. Multi-label classification could be utilized based on industry and/or enterprise requirements to provide increased specificity of whether different types of required compliance statements should have been provided by the agent. For example, a three variable label could be utilized in the banking industry for a general compliance model trained on a phrase list to recognize multiple and/or different compliance related triggering phrases. In this case the three variable label may recognize triggering phrases for loans, interest rates, and credit cards which each require different compliance statements. The three-label output vector could be (X, Y, Z) where X is loans, Y is interest rates, and Z is credit cards. The presence of a 1 indicates that a compliance statement for the relevant label should have been provided. While the presence of a 0 in the output vector indicates that no compliance statement should have been provided. An example output could be (1, 1, 0) if the content included triggering phrases for loans and interest rates but no triggering phrase for credit cards. In either binary or multi-label vector instances, the values for the prediction can contain a raw prediction (e.g., decimal values) or a binary classification (e.g., 1 and 0 as described above). The one or more compliance models as well as the output from a compliance model may be stored in the data store 108.

The compliance model engine 126 applies the one or more trained compliance models to evaluate one or more pieces of content for whether or not a compliance statement should have been provided. Initially, the compliance model engine 126 analyzes a piece of content for a triggering phrase. The output of the model is as described above based on the vector type to indicate that a compliance statement should or should not have been provided. Then, the compliance model engine 126 searches the piece of content to determine if the relevant compliance statement is present or absent within the piece of content. The amount of the piece of content that is searched can be modified by applying a content search parameter as described above. The compliance model engine 126 may output the presence or absence of a required compliance statement in conjunction with the compliance models prediction and store them in the data store 108.

The evaluation module 128 may be utilized to evaluate performance across one or more agent-customer interactions and/or across a period of time at providing the required compliance statements. The evaluation module 128 receives the output of the compliance model engine 126 and processes it to generate one or more reports for a supervisor relating to the subject being evaluated. In some embodiments, the evaluation module 128, may weight the output to account for relative importance of a particular compliance statement type over other types of compliance statements. For example, compliance statements relating to regulatory issues (e.g., banking, interest rates, loans, etc.) which may have a corresponding legal liability if not provided may be weighted higher. Conversely, policy based compliance statements such as those relating to a specific enterprise policy (e.g., return policy, product information, etc.) with limited to no associated legal liability may be weighted lower.

The subject being evaluated can be agent-based and/or it can be topic based. Agent based evaluations review the performance of one or more agents at providing the required compliance statement. The scope of the agent-based evaluation is variable such that a single agent could be evaluated, agents and/or teams of agents within the same contact center could be evaluated and/or compared to each other, up to an industry wide-comparison of multiple agents against other agents across multiple different enterprises to see if industry standards are being met. For example, an agent-based evaluation may focus on a single agent as the subject where the content utilized to generate the reports are directly related to agent-customer interactions involving the agent. In another example, agents within the same contact center could be evaluated and their performance compared against each other to analyze an individual agent and/or a group of agents. In instances where multiple agents are the subject of the evaluation, content relating to each agent's customer interactions will be aggregated to produce the evaluation results. Once the subject of the evaluation is determined the evaluation module 128 may retrieve the output of the presence or absence of the required compliance statement including the predictions from the compliance model from the data store 108 to perform the evaluation.

Topic-based evaluations review performance at providing the required compliance statement based on a topic independent of a specific agent or group of agents. The source content for a topic-based subject are agent-customer interactions identified to be applicable to the topic being evaluated. For example, a topic-based evaluation could be a review of performance at providing one or more of a certain type of compliance statement, such as a compliance statement for interest rates, loans, or HIPAA disclosures. The scope of a topic-based evaluation is also variable, such that the content for the evaluation can be sourced from a single agent, one or more agents at the same contact center and/or within the same enterprise, up to an industry wide-comparison of multiple agents across multiple different enterprises. In this case the evaluation is an aggregation of one or more pieces of content relating to that topic, independent of the agent who generated the content.

The evaluation module 128 may apply one or more performance standards to evaluate subject performance. A performance standard may be a threshold value which defines an acceptable performance level for the subject in providing the required compliance statement. In some aspects, the performance standard may be a binary result (e.g., was the required compliance statement provided or not, were all required compliance statements provided or not, was the compliance statement provided within the bounds of the content search parameter, etc.). The threshold value can be defined for the performance standard where the result of the evaluation determines if the subject satisfied the performance standard at or above the threshold value. The supervisor using supervisor device 106, can manually adjust the performance standard threshold as required to refine the outcome of the evaluation. For example, a threshold value could be set for an agent-based subject where the agent needs to provide the required compliance statement within the content search parameter range 80% of the time or better. An evaluation can include a combination of binary and/or threshold performance standards. Using the previous example, an evaluation could include information showing whether the agent satisfied the 80% threshold for providing the compliance statement within the content search parameter range and a binary performance standard for providing the compliance statement at all.

The performance standard may be measured across contacts and/or time. In the case of contacts, the subject may be evaluated on effectiveness in providing the required compliance statements over a certain number of agent-customer interactions, to a certain performance standard. For example, the performance standard may be a threshold value requiring 90% effectiveness in providing the required compliance statement over two hundred agent-customer interactions. If the evaluation is measured across time, different time periods could be specified to evaluate agent performance. In this case, the time period could be a work shift, a work week, or longer. Alternatively, the time period could be a segmented portion where the analysis breaks down subject performance during different portions of time for comparison. For example, subject effectiveness at providing the required compliance statement could be analyzed over the course of a 30-day period by hour of the shift, such that each hour of the shift is analyzed to show subject effectiveness relative to the performance standard for each day of the 30-day period. The variable nature of the measurement length for the performance standard, either by number of contacts and/or by period of time, allows for the evaluation module to review a very high volume of agent-customer interactions relative to what would be possible for a human to do manually. This is especially true when the subject of the evaluation is a team of agents, or a topic being evaluated from an industry or contact center wide level with a plurality of agents involved. The very high volume of interactions considered provides a more complete and accurate evaluation outcome.

In some embodiments, the output of the compliance model can be refined for evaluation by the inclusion of a content search parameter. In this case the output of the compliance model is a prediction that the compliance statement should or should not be present within the identified portion of the piece of content based on the content search parameter. In this case the content search parameter can be applied to any amount or fashion to the piece of content, such as from the triggering phrase to the end of the piece of content. Applying a content search parameter may also result in the output including a multi-label vector. For example, the multi-label vector may have three label types: 1) present within the content search parameter; 2) not present within the content search parameter but present within the content; and 3) not present within the content. If a triggering phrase was identified by the compliance model and given within the content search parameter as required, the output would be (1, 0, 0). Alternatively, if a triggering phrase was identified by the compliance model but not given within the content search parameter, the output would be (0, 1, 0). The multi-label classifications may vary based on industry and/or enterprise specific preferences similar to those associated with defining the content search parameter.

The evaluation module 128 will evaluate the defined subject based on the selected performance standards to identify where standards are being met and where they are not. In some examples based on the evaluation, the evaluation module 128 can identify areas where the subject is deficient relative to standards and recommend additional coaching and/or training to overcome the deficiency. The evaluation module 128 may generate a report and notify the supervisor of the outcome of the evaluation via a notification on supervisor device 106.

The network 150 may comprise one or more networks such as local area networks (LANs), wide area networks (WANs), enterprise networks, the Internet, etc. and may include one or more of wired, wireless, and/or optical portions. It should be appreciated that while multiple agents and supervisors each utilizing an agent device 104 or supervisor device 106 may each work at a contact center, they do not need to be geographically collocated, but rather may be geographically dispersed but connected via network 150.

In aspects, the customer device 102, agent device 104, and supervisor device 106 may be any device that can receive, process, modify, and communicate content on the network 150. Examples of a customer device 102, agent device 104, and supervisor device 106 include a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer), telephone, mobile device, and/or a wireless device where a customer, contact center agent, and/or contact center supervisor may interact with each other. Customer device 102, agent device 104, and supervisor device 106 may be configured to execute one or more software applications (or "applications") and/or services and/or manage hardware resources (e.g., processors, memory, etc.), which may be utilized by users of the customer device 102, agent device 104, and supervisor device 106.

The customer device 102, agent device 104, and supervisor device 106 may include an application (not pictured) which displays content for use on the customer device 102, agent device 104, and supervisor device 106 and for communication across the network 150. The application may be a native application or a web-based application. The application may operate substantially locally to the customer device 102, agent device 104, and supervisor device 106 or may operate according to a server/client paradigm in conjunction with one or more servers (not shown). The application may be used for communication across the network 150, to engage in customer-agent interactions, and/or to perform compliance statement identification and evaluation as described herein. The application may be used for communication across the network 150 and/or to view content relating to compliance statement identification and/or agent evaluation.

For ease of discussion, the description herein refers to a single customer device 102, a single agent device 104, and a single supervisor device 106. But features and examples of the customer device 102, agent device 104, and supervisor device 106 are applicable to multiple devices. Further, it is contemplated that the agent device 104 and supervisor device 106 are interchangeable within the contact center as both devices are part of the larger contact center enterprise network.

The customer device 102, agent device 104, supervisor device 106, and compliance statement engine 120 may include at least one processor, such as content processor 122, that executes software and/or firmware stored in memory. The software/firmware code contains instructions that, when executed by the processor causes control logic to perform the functions described herein. The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the disclosed aspects, various logic may be implemented in any appropriate fashion and would remain in accordance with the aspects herein disclosed In accordance with some examples disclosed herein, the customer device 102, agent device 104, supervisor device 106, and compliance statement engine 120 may have access to data contained in a data store 108. The data store 108 may contain content related to agent-customer interactions, other agent information, compliance statement data, and other data related to evaluating agent performance at providing a required compliance statement to the customer. Data store 108 is a network server, cloud server, network attached storage ("NAS") device, or another suitable computing device. Data store 108 may include one or more of any type of storage mechanism or memory, including a magnetic disc (e.g., in a hard disk drive), an optical disc (e.g., in an optical disk drive), a magnetic tape (e.g., in a tape drive), a memory device such as a random-access memory (RAM) device, a read-only memory (ROM) device, etc., and/or any other suitable type of storage medium. Although only one instance of the data store 108 is shown in FIG. 1, the system 100 may include two, three, or more similar instances of the data store 108. Moreover, the network 150 may provide access to other data stores, similar to data store 108 that are located outside of the system 100, in some aspects.

As will be appreciated, the various methods, devices, apps, nodes, features, etc., described with respect to FIG. 1 or any of the figures described herein, are not intended to limit the system to being performed by the particular apps and features described. Accordingly, additional configurations may be used to practice the methods and systems herein and/or features and apps described may be excluded without departing from the methods and systems disclosed herein.

Figure 2:
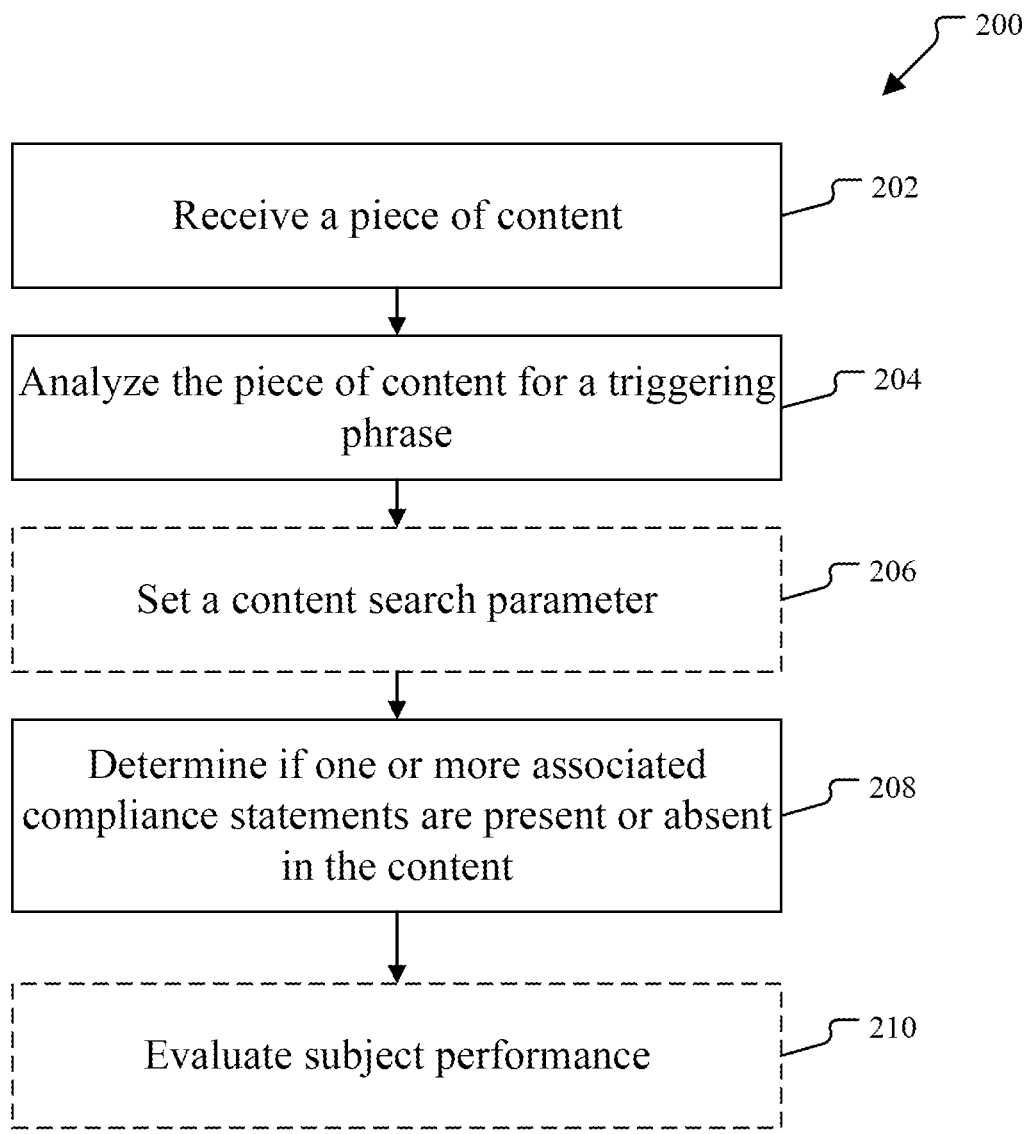
FIG. 2 is a block diagram illustrating a method for using a compliance model to identify a compliance statement and evaluate agent performance, according to aspects described herein.

FIG. 2 is a block diagram illustrating a method for using a compliance model to identify a compliance statement and evaluate agent performance, according to aspects described herein. A general order of the operations for the method 200 is shown in FIG. 2. Generally, the method 200 begins with operation 202 and ends with operation 210. The method 200 may include more or fewer steps or may arrange the order of the steps differently than those shown in FIG. 2. The method 200 can be executed as computer-executable instructions executed by a computer system and encoded or stored on a computer readable medium or other non-transitory computer storage media. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4, and 5.

At operation 202, one or more pieces of content are received. The pieces of content are received by the compliance model engine (e.g., compliance model engine 126). The content is a record of interaction between an agent and a customer at a call center. In some examples, the content may not need to be processed to generate a transcript prior to analysis by a compliance model. In other examples, the content may need to be processed into a transcript that is a text-based record of the agent-client interaction labeled for the speaker/actor.

At operation 204, the compliance model engine identifies one or more triggering phrases in the received content. One or more compliance models may be utilized to analyze a piece of content and output predictions for whether a triggering phrase exists in the content. The triggering phrase is a portion of the agent-customer interaction with context indicating that a compliance statement is required to be provided by the agent. The compliance model, having been fine-tuned based on an applicable relevant phrase list, is trained to recognize triggering phrases and output a prediction of whether or not a compliance statement should have been provided by an agent. Additionally, the compliance model may be fine-tuned in training to recognize triggering phrases that are not explicitly included in the relevant phrase list based on the context surrounding the phrase. In some instances, the output of the model may be a binary vector of length two indicating that a compliance statement should have been provided, which is an indication that a triggering phrase associated with the compliance statement is in the content. In other instances, the output of the model may be a multi-label vector of length N, where N is the number of compliance statements triggers that a model is tuned to search for.

At operation 206, an optional content search parameter can be set by the compliance model engine (e.g., compliance model engine 126). The content search parameter may specify how the compliance model engine should search the piece of content to determine if the compliance statement associated with the triggering phrase is present or absent in the content. The content search parameter can be set based on the requirements of the industry and/or enterprise. In some instances, the content search parameter may specify that the search should be from the triggering phrase to the end of the content, indicating that the compliance statement must occur following the triggering phrase. Alternatively, a time or word limit from the triggering phrase could be set as the content search parameter to evaluate agent performance at providing the compliance statement shortly after the triggering phrase. In further aspects, the content search parameter could be set to for anywhere in the content, indicating that the presence of the associated compliance statement at any point of the agent-customer interaction is sufficient. It will be appreciated by one having skill in the art that a plurality of content search parameters could be applied based on industry and/or enterprise preferences.

At operation 208, the compliance model engine (e.g., compliance model engine 126) determines if one or more compliance statements associated with the triggering phrase are present or absent in the content. The compliance model engine may utilize natural language processing, large language models, phrase matching, and/or other machine learning methods to identify the associated compliance statements in the content. In some aspects, if a content search parameter was set at operation 206, the compliance model engine may apply the parameter to its search and only search as indicated by the parameter. In alternative aspects, the content search parameter may be included as part of the output, but the entire piece of content may be searched to determine if the compliance statement was or was not provided by the agent. In this way the content search parameter does not necessarily limit the compliance model engine from searching the entire piece of content for the compliance statement. Instead, the content search parameter may function as a threshold value indicating both industry and/or enterprise expectations along with agent performance at providing the compliance statement at all. The compliance model engine may provide an indication of one or both of the output of the compliance model and/or the presence or absence of the associated compliance statement. In instances with a multi-label output from the compliance model predicting that multiple compliance statements should be present, the compliance model engine will determine if each of the predicted compliance statements are present or absent.

At operation 210, compliance statement performance may be optionally evaluated based by the evaluation module (e.g., evaluation module 128). Compliance statement performance may be evaluated based on a performance standard being applied to the subject, where the subject may be agent-based or topic-based. The results determined by the evaluation can be used for additional training or performance feedback.

Figure 3:
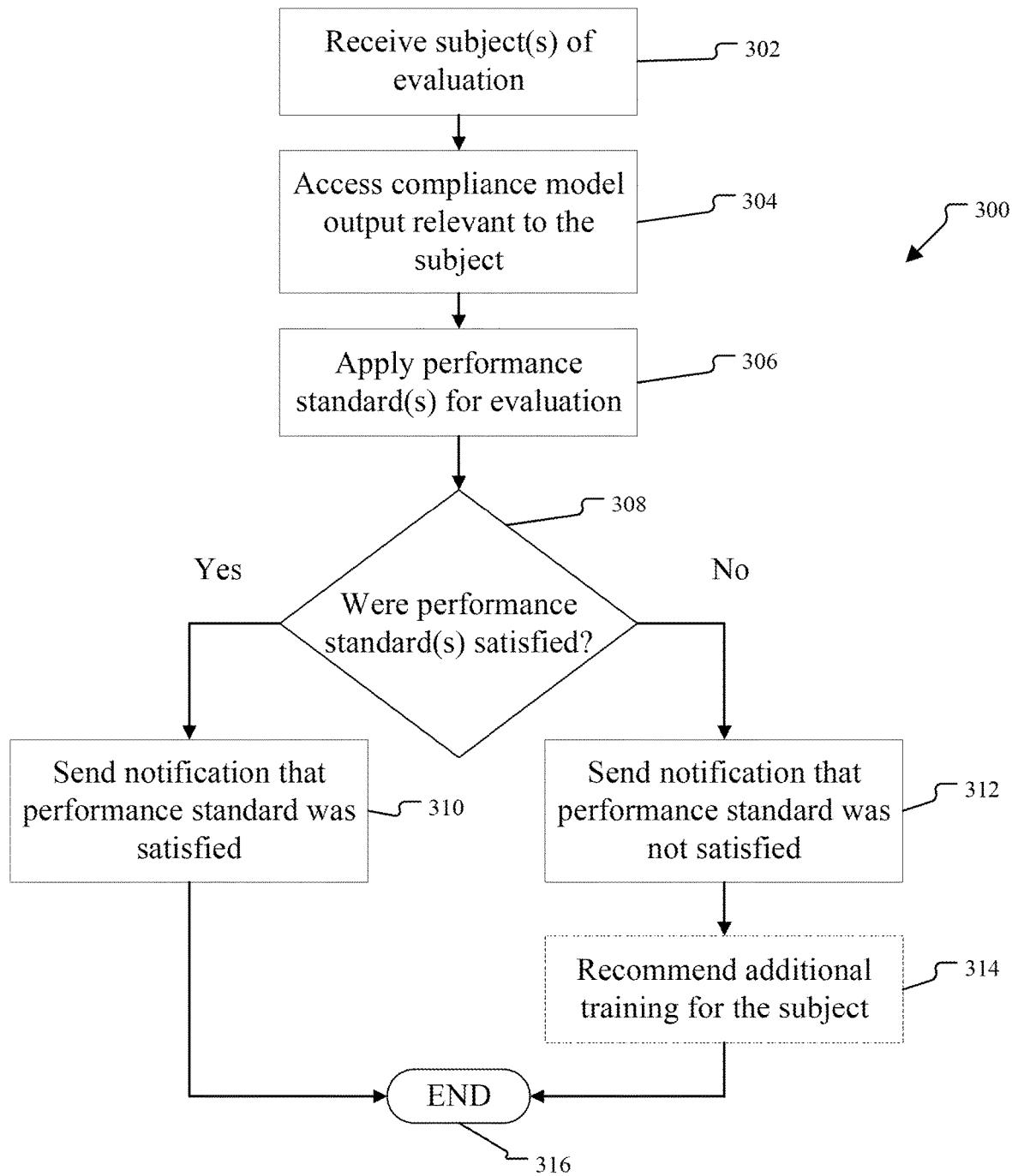
FIG. 3 is a block diagram illustrating a method for evaluating compliance statement performance, according to aspects described herein.

FIG. 3 is a block diagram illustrating a method for evaluating compliance statement performance, according to aspects described herein. A general order of the operations for the method 300 is shown in FIG. 3. Generally, the method 300 begins with operation 302 and ends with operation 314. The method 300 may include more or fewer steps or may arrange the order of the steps differently than those shown in FIG. 3. The method 300 can be executed as computer-executable instructions executed by a computer system and encoded or stored on a computer readable medium or other non-transitory computer storage media. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 4 and 5.

At operation 302, an evaluation module (e.g., evaluation module 128) may receive the subject of the evaluation. The subject of the evaluation may be received from a supervisor using the supervisor device 106. The subject of the evaluation could be an agent-based evaluation (e.g., a single agent, a team of agents, a comparison of agents against other agents, etc.), a topic-based evaluation, and/or a combination of the two categories.

Once the subject of the evaluation has been received, at operation 304, the evaluation module (e.g., evaluation module 128) may access the data store 108 to retrieve the compliance model output relevant to the subject. The compliance model output may include the results of whether an associated compliance statement was present or absent in the content. In some aspects, the results may also include the output predictions of the compliance model. The compliance model output will be the basis for the evaluation of the subject.

At operation 306, one or more performance standard for the evaluation is applied by the evaluation module (e.g., evaluation module 128) to analyze the compliance model output. The one or more performance standards are the basis by which the subject will be evaluated. The performance standards may vary by subject type such that they represent the intended standard which should be met or exceeded for the subject of the evaluation. In some instances, the performance standard may be optionally adjusted to create a certain evaluation focus for the subject. The performance standard may be adjusted based on making each of the performance standards a binary or threshold value, as well as by adjusting the measurement term to be based on a number of contacts or a period of time. It is understood that if multiple performance standards are being applied in the evaluation that each of the performance standards may be adjusted to different values and measurements independent of each other, as one having skill in the art will understand.

At decision operation 308 it is determined if the subject satisfied the one or more performance standards. The evaluation module (e.g., evaluation module 128) processes the compliance model output as a comparison to the one or more performance standards, with the results being based individually on each performance standard applied to the compliance model output. For example, if the compliance model output was for an agent as the subject, and the agent was being evaluated based on three performance standards for three different types of compliance statements the result of the evaluation may be that two performance standards are satisfied and one was not. In some embodiments, the evaluation module, may weight the output to account for relative importance of a particular compliance statement type over other types of compliance statements. If a performance standard is satisfied, the method proceeds to operation 310 where a notification will be sent by the evaluation module to the supervisor that the performance standard was satisfied. Alternatively, if the performance standard was not satisfied, the method proceeds to operation 312 where a notification will be sent by the evaluation module to the supervisor that the performance standard was not satisfied. In some examples, if a performance standard was not satisfied the notification may include operation 314 as an optional recommendation from the evaluation module for additional training and/or coaching options available to improve subject performance. The method ends with end operation 316.

Figure 4:
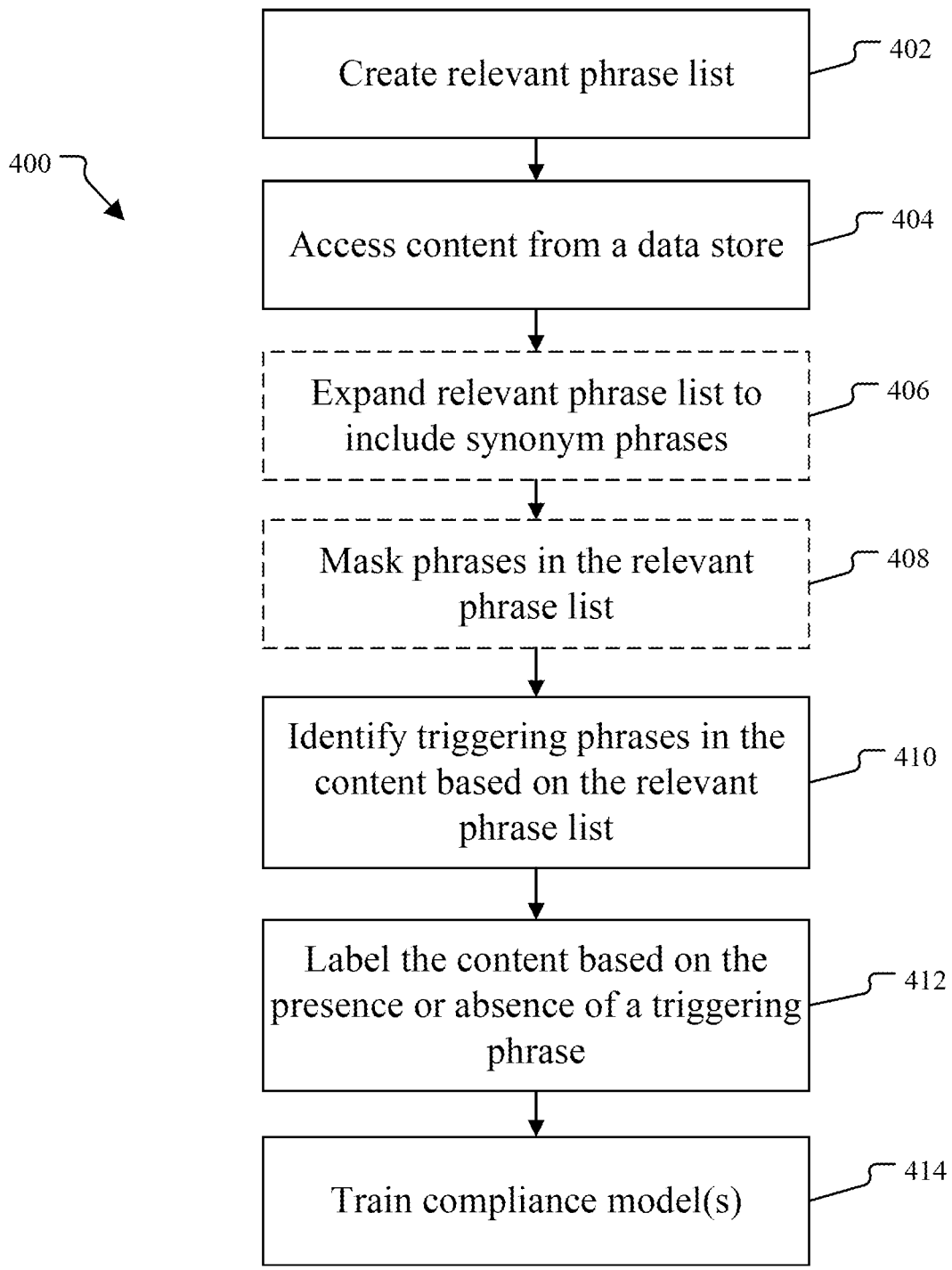
FIG. 4 is a block diagram illustrating a method for training a compliance model to identify compliance statements, according to aspects described herein.

FIG. 4 is a block diagram illustrating a method for training a compliance model to identify compliance statements, according to aspects described herein. A general order of the operations for the method 400 is shown in FIG. 4. Generally, the method 400 begins with operation 402 and ends with operation 416. The method 400 may include more or fewer steps or may arrange the order of the steps differently than those shown in FIG. 4. The method 400 can be executed as computer-executable instructions executed by a computer system and encoded or stored on a computer readable medium or other non-transitory computer storage media. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, 3, and 5.

At operation 402, a relevant phrase list is created by a compliance model generator (e.g., compliance model generator 124). The relevant phrase list may include enterprise specific compliance statements along with one or more associated triggering phrases which could occur in a piece of content and indicate the associated compliance statement should be provided. The relevant phrase list may be created based on the specific requirements of the industry or enterprise which the compliance model is being generated for.

At operation 404, one or more pieces of content may be accessed from a data store (e.g., data store 108) by the compliance model generator (e.g., compliance model generator 124). The content will form the basis for developing the training data that will fine-tune the compliance model. In some aspects the compliance model generator may access the content directly. In alternative aspects, the compliance model generator may access a transcript of the content labeled for each speaker (e.g., agent or customer).

Operations 406 and 408 are optional steps where the relevant phrase list may be modified to improve the training data and ultimately increase the capability of the generated compliance model at predicting when a compliance statement should be provided by the agent. At operation 406 the relevant phrase list may be expanded to include synonym phrases by the compliance model generator (e.g., compliance model generator 124). To improve the ability of the generated compliance model to recognize triggering phrases from a piece of content, the relevant phrase list may be expanded to include synonym phrases based on one or more common variations of the phrases already included in the relevant phrase list. The compliance model generator may include one or more natural language processing tools to include synonym phrases such as fuzzy matching, phonetic matching, phrase embeddings, and/or gestalt pattern matching. At operation 408, certain portions of a phrase in the relevant phrase list may be masked to create a masked phrase list by the compliance model generator. In this case, portions of a triggering phrase included in the relevant phrase list may be removed while the remaining contextual arrangement of the words in the triggering phrase remains for training the large language model. In some aspects one or both of the unmasked and masked relevant phrase lists may be utilized to generate training data for the model.

At operation 410, the compliance model generator (e.g., compliance model generator 124) will identify one or more triggering phrases in the content based on the relevant phrase list. The compliance model generator may utilize one or more natural language processing methods to identify the triggering phrases.

At operation 412, the content will be labeled for presence or absence of one or more triggering phrases by the compliance model generator (e.g., compliance model generator 124). The labeling may occur as a binary classification or a multi-label classification based on the number of triggering phrases which were identified at operation 410. The compliance model generator may label the piece of content as either containing the triggering phrase or not. The labeling may be a binary classification where the presence of a triggering phrase has a label of "1" while the absence of a triggering phrase has a label of "0." If a multi-label classification is applied the piece of content may be labeled with multiple labels (e.g., "1" and "0") indicating the presence or absence of the multiple triggering phrases.

At operation 414, the labeled content with the triggering phrases is used as training data by the compliance model generator (e.g., compliance model generator 124) to train a deep learning large language model into a compliance model. The large language model may be BERT, distilBERT, or other suitable models. One or more compliance models may be generated based on training data derived from different relevant phrase lists to learn the context surrounding a required compliance statement. The compliance models can be generated to recognize different types of triggering phrases for specific compliance statements based on industry and/or enterprise requirements.

Figure 5:
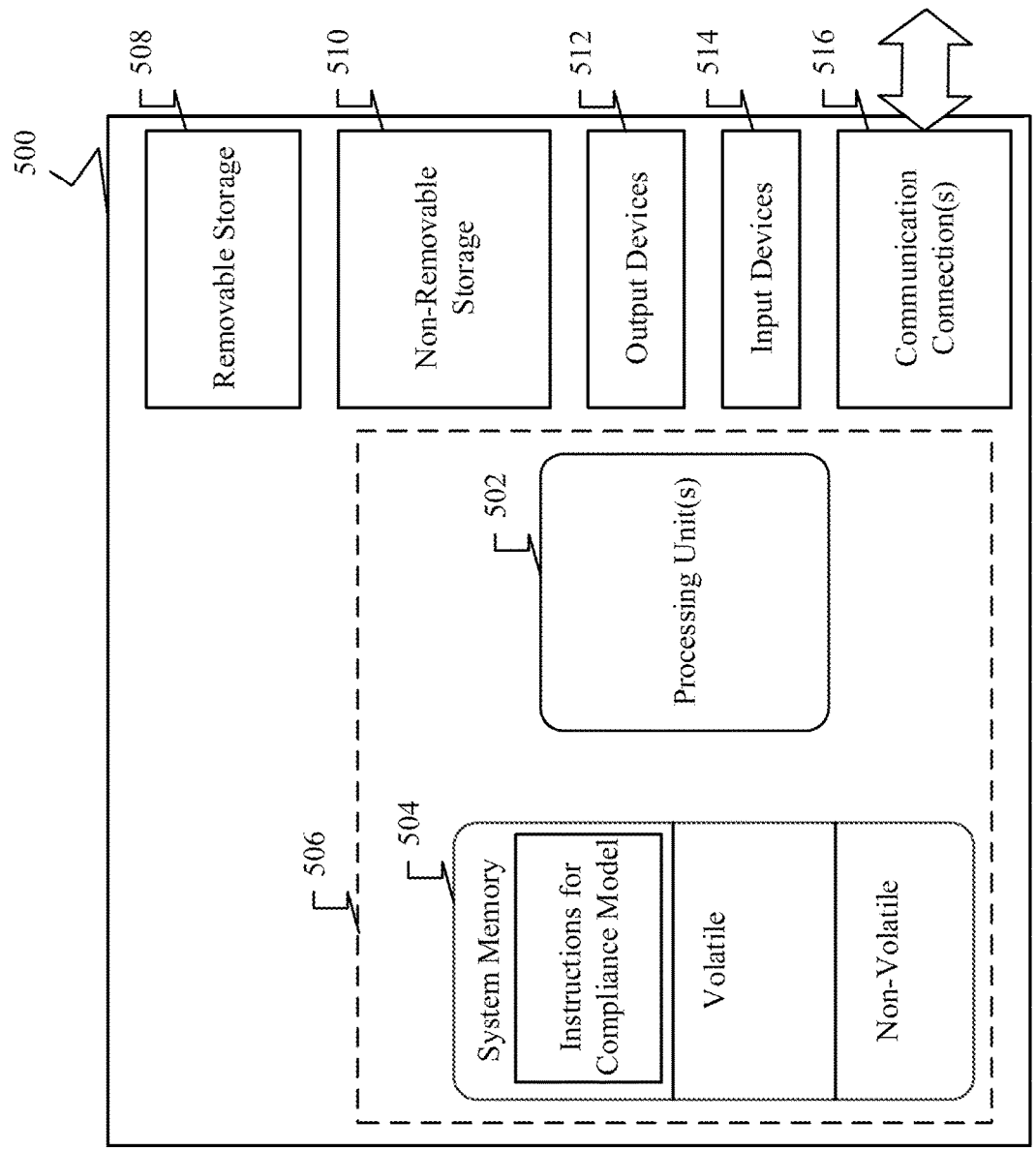
FIG. 5 illustrates a simplified block diagram of a device with which aspects of the present disclosure may be practiced, according to aspects described herein.

FIG. 5 illustrates a simplified block diagram of a device with which aspects of the present disclosure may be practiced, according to aspects described herein. The device may be a mobile computing device, for example. One or more of the aspects disclosed herein may be implemented in an operating environment 500. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 500 typically includes at least one processing unit 502 and memory 504. Depending on the exact configuration and type of computing device, memory 504 (e.g., instructions for hybrid scheduling as disclosed herein) may be volatile (such as RAM), non-volatile (such as ROM, flash memory, etc.), or some combination of the two. This most basic configuration is illustrated in FIG. 5 by dashed line 506. Further, the operating environment 500 may also include storage devices (removable, 508, and/or non-removable, 510) including, but not limited to, magnetic or optical disks or tape. Similarly, the operating environment 500 may also have input device(s) 514 such as remote controller, keyboard, mouse, pen, voice input, on-board sensors, etc. and/or output device(s) 512 such as a display, speakers, printer, motors, etc. Also included in the environment may be one or more communication connections 516, such as LAN, WAN, a near-field communications network, a cellular broadband network, point to point, etc.

Operating environment 500 typically includes at least some form of computer readable media. Computer readable media can be any available media that can be accessed by the at least one processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in-offices, enterprise-wide computer networks, intranets and the Internet.

According to an embodiment of the present disclosure, a system is disclosed comprising at least one processor, and memory storing instructions that, when executed by the at least one processor, causes the system to perform a set of operations, the set of operations comprising receive a piece of content, identify one or more triggering phrases in the piece of content using a compliance model, wherein the compliance model is a large language machine learning model trained on labeled content based on a relevant phrase list, and determine if one or more compliance statements associated with the identified one or more triggering phrases are present or absent in the piece of content.

In various embodiments of the disclosure, further comprising set a content search parameter, wherein the content search parameter is a search limit applied to limit how much of the piece of content and what portions of the piece of content are searched to determine if the one or more compliance statements are present or absent in the piece of content.

In various embodiments of the disclosure, further comprising evaluate subject performance based on the presence or absence of an associated compliance statement in the piece of content.

In various embodiments of the disclosure, wherein evaluate subject performance further comprises receive the subject for an evaluation, access one or more compliance model outputs relevant to the subject of the evaluation, analyze the one or more compliance model outputs based on one or more performance standards, wherein a performance standard is a threshold value which defines an acceptable performance level for the subject in providing the required compliance statement, determine if an agent satisfies the one or more performance standards, and send a notification that agent did or did not satisfy the performance standard.

In various embodiments of the disclosure, wherein a performance standard is measured based on a number of contacts or a period of time.

In various embodiments of the disclosure, further comprising recommend additional training for the subject.

In various embodiments of the disclosure, wherein a phrase comprises an expression of something in speech or text from an individual in the content which may occur as a statement, utterance, sentence, action, or any other segment of speech or text of varying length.

According to an embodiment of the disclosure, a method is disclosed comprising receiving a piece of content, identifying one or more triggering phrases in the piece of content using a compliance model, wherein the compliance model is a large language machine learning model trained on labeled content based on a relevant phrase list, and determining if one or more compliance statements associated with the identified one or more triggering phrases are present or absent in the piece of content.

In various embodiments of the disclosure, further comprising setting a content search parameter, wherein the content search parameter is a search limit applied to limit how much of the piece of content and what portions of the piece of content are searched to determine if the one or more compliance statements are present or absent in the piece of content.

In various embodiments of the disclosure, further comprising evaluating subject performance based on the presence or absence of an associated compliance statement in the piece of content.

In various embodiments of the disclosure, wherein evaluate subject performance further comprises receiving the subject for an evaluation, accessing one or more compliance model outputs relevant to the subject of the evaluation, analyzing the one or more compliance model outputs based on one or more performance standards, wherein a performance standard is a threshold value which defines an acceptable performance level for the subject in providing the required compliance statement, determining if an agent satisfies the one or more performance standards, and sending a notification that agent did or did not satisfy the performance standard.

In various embodiments of the disclosure, wherein a performance standard is measured based on a number of contacts or a period of time.

In various embodiments of the disclosure, further comprising recommending additional training for the subject.

In various embodiments of the disclosure, wherein a phrase comprises an expression of something in speech or text from an individual in the content which may occur as a statement, utterance, sentence, action, or any other segment of speech or text of varying length.

According to an embodiment of the disclosure, a method is disclosed comprising creating a relevant phrase list, accessing content relating to one or more agent-customer interactions, identifying one or more triggering phrases in the content based on the relevant phrase list, determining if a compliance statement associated with the one or more triggering phrases was provided in the content, labeling the content based on the presence or absence of a compliance statement associated with the one or more triggering phrases, and training a compliance model, wherein the compliance model is a large language machine learning model trained on labeled content based on a relevant phrase list to predict when a compliance statement should be provided.

In various embodiments of the disclosure, further comprising expanding the relevant phrase list to include synonym phrases.

In various embodiments of the disclosure, further comprising masking one or more phrases in the relevant phrase list, wherein masking comprises removing certain words, phrases, topics, actions, and utterances from a triggering phrase in the relevant phrase list.

In various embodiments of the disclosure, wherein labeling the content further comprises labeling the content where the compliance statement is present with a 1.

In various embodiments of the disclosure, wherein labeling the content further comprises labeling the content where the compliance statement is not present with a 0.

In various embodiments of the disclosure, wherein training a compliance model further comprises training a plurality of compliance models for a specific industry or enterprise requirements, wherein the plurality of compliance models are trained with labeled content derived from a plurality of relevant phrase lists created with triggering phrases for the specific industry or enterprise requirements.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:

receive a piece of content;

identify one or more triggering phrases in the piece of content using a compliance model, wherein the compliance model is a large language machine learning model trained on labeled content based on a relevant phrase list;

determine if one or more compliance statements associated with the identified one or more triggering phrases are present or absent in the piece of content;

receive a subject for an evaluation; and evaluate subject performance based on the presence or absence of an associated compliance statement in the piece of content, wherein evaluating the subject performance comprises:

accessing one or more compliance model outputs relevant to the subject of the evaluation;

analyzing the one or more compliance model outputs based on one or more performance standards, wherein a performance standard is a threshold value which defines an acceptable performance level for the subject in providing the required compliance statement;

determining if an agent satisfies the one or more performance standards; and sending a notification that agent did or did not satisfy the performance standard.

2. The system of claim 1, further comprising:

set a content search parameter, wherein the content search parameter is a search limit applied to limit how much of the piece of content and what portions of the piece of content are searched to determine if the one or more compliance statements are present or absent in the piece of content.

3. The system of claim 1, wherein a performance standard is measured based on a number of contacts or a period of time.

4. The system of claim 3, further comprising:

recommend additional training for the subject.

5. The system of claim 1, wherein a phrase comprises an expression of something in speech or text from an individual in the content which may occur as a statement, utterance, sentence, action, or any other segment of speech or text of varying length.

6. A method comprising:

receiving a piece of content;

identifying one or more triggering phrases in the piece of content using a compliance model, wherein the compliance model is a large language machine learning model trained on labeled content based on a relevant phrase list;

determining if one or more compliance statements associated with the identified one or more triggering phrases are present or absent in the piece of content;

receiving the subject for an evaluation;

accessing one or more compliance model outputs relevant to the subject of the evaluation;

analyzing the one or more compliance model outputs based on one or more performance standards, wherein a performance standard is a threshold value which defines an acceptable performance level for the subject in providing the required compliance statement;

determining if an agent satisfies the one or more performance standards; and sending a notification that agent did or did not satisfy the performance standard.

7. The method of claim 6, further comprising:

setting a content search parameter, wherein the content search parameter is a search limit applied to limit how much of the piece of content and what portions of the piece of content are searched to determine if the one or more compliance statements are present or absent in the piece of content.

8. The method of claim 6, wherein a performance standard is measured based on a number of contacts or a period of time.

9. The method of claim 8, further comprising:

recommending additional training for the subject.

10. The method of claim 6, wherein a phrase comprises an expression of something in speech or text from an individual in the content which may occur as a statement, utterance, sentence, action, or any other segment of speech or text of varying length.

11. A method comprising:

creating a relevant phrase list;

accessing content relating to one or more agent-customer interactions;

identifying one or more triggering phrases in the content based on the relevant phrase list;

determining if a compliance statement associated with the one or more triggering phrases was provided in the content;

labeling the content based on the presence or absence of a compliance statement associated with the one or more triggering phrases; and training a compliance model, wherein the compliance model is a large language machine learning model trained on labeled content based on a relevant phrase list to predict when a compliance statement should be provided.

12. The method of claim 11, further comprising:

expanding the relevant phrase list to include synonym phrases.

13. The method of claim 11, further comprising:

masking one or more phrases in the relevant phrase list, wherein masking comprises removing certain words, phrases, topics, actions, and utterances from a triggering phrase in the relevant phrase list.

14. The method of claim 11, wherein labeling the content further comprises:

labeling the content where the compliance statement is present with a 1.

15. The method of claim 11, wherein labeling the content further comprises:

labeling the content where the compliance statement is not present with a 0.

16. The method of claim 11, wherein training a compliance model further comprises:

training a plurality of compliance models for a specific industry or enterprise requirements, wherein the plurality of compliance models are trained with labeled content derived from a plurality of relevant phrase lists created with triggering phrases for the specific industry or enterprise requirements.

\* \* \* \* \*